(12) United States Patent
Shepherd et al.

(10) Patent No.: US 11,261,790 B2
(45) Date of Patent: Mar. 1, 2022

(54) SYSTEMS AND METHODS FOR CONTROLLING LIQUID FLOW TO A TURBINE FOGGING ARRAY

(71) Applicant: Caldwell Tanks, Inc., Louisville, KY (US)

(72) Inventors: Donald W. Shepherd, Shelbyville, KY (US); Mark Ammons, New Albany, IN (US); Brian Scoggins, Georgetown, IN (US)

(73) Assignee: Caldwell Tanks, Inc., Louisville, KY (US)

( * ) Notice: Subject to any disclaimer, the term of this patent is extended or adjusted under 35 U.S.C. 154(b) by 0 days.

(21) Appl. No.: 16/785,906

(22) Filed: Feb. 10, 2020

(65) Prior Publication Data
US 2021/0003077 A1    Jan. 7, 2021

Related U.S. Application Data

(63) Continuation of application No. 14/952,379, filed on Nov. 25, 2015, now Pat. No. 10,557,413.

(60) Provisional application No. 62/085,114, filed on Nov. 26, 2014.

(51) Int. Cl.
| | |
|---|---|
| *F02C 7/057* | (2006.01) |
| *F02C 3/30* | (2006.01) |
| *F02C 7/143* | (2006.01) |
| *F02C 9/28* | (2006.01) |

(52) U.S. Cl.
CPC ............ *F02C 7/057* (2013.01); *F02C 3/30* (2013.01); *F02C 7/1435* (2013.01); *F02C 9/28* (2013.01); *F05D 2220/32* (2013.01); *F05D 2260/212* (2013.01); *F05D 2260/607* (2013.01); *F05D 2270/16* (2013.01); *F05D 2270/311* (2013.01); *F05D 2270/44* (2013.01); *F23N 2225/26* (2020.01)

(58) Field of Classification Search
CPC .... F02C 9/28; F02C 3/30; F02C 3/305; F05D 2260/212; F05D 2270/16; F05D 2270/44; F05D 2270/311
See application file for complete search history.

(56) References Cited

U.S. PATENT DOCUMENTS

| | | | | |
|---|---|---|---|---|
| 6,478,289 B1 * | 11/2002 | Trewin | ................... | F01K 21/047 |
| | | | | 261/27 |
| 6,623,254 B2 * | 9/2003 | Chowaniec | ........... | F02C 7/1435 |
| | | | | 417/403 |
| 7,040,083 B2 * | 5/2006 | Horii | ..................... | F02C 7/1435 |
| | | | | 60/39.3 |

(Continued)

*Primary Examiner* — Alain Chau
(74) *Attorney, Agent, or Firm* — Middleton Reutlinger

(57) ABSTRACT

Methods and apparatus for controlling liquid flow to a turbine fogging array. Some implementations are generally directed toward adjusting the output of a variable output pump that supplies water to the turbine fogging array. In some of those implementations, the output is adjusted based on a determined target pump output value that is indicative of a pump output required to change the moisture content of intake air of a combustion turbine to meet a target humidity value. Some implementations are generally directed toward actuating at least one control valve of a plurality of control valves that control liquid throughput to one or more fogging nozzles of a fogging array.

8 Claims, 4 Drawing Sheets

(56) References Cited

U.S. PATENT DOCUMENTS

| | | | | |
|---|---|---|---|---|
| 7,353,654 | B2* | 4/2008 | Bolis | F04D 29/5846 |
| | | | | 60/775 |
| 7,353,655 | B2* | 4/2008 | Bolis | F04D 29/5846 |
| | | | | 60/775 |
| 7,353,656 | B2* | 4/2008 | Bolis | F01K 21/047 |
| | | | | 60/775 |
| 7,428,818 | B2* | 9/2008 | Hjerpe | B08B 9/00 |
| | | | | 60/775 |
| 7,526,920 | B2* | 5/2009 | Hoffmann | B05B 12/085 |
| | | | | 60/39.53 |
| 7,703,272 | B2* | 4/2010 | Wagner | F01D 25/007 |
| | | | | 60/39.53 |
| 7,784,286 | B2* | 8/2010 | Bolis | F02C 7/1435 |
| | | | | 60/775 |
| 2002/0083712 | A1* | 7/2002 | Tomlinson | F02C 7/1435 |
| | | | | 60/775 |
| 2004/0255596 | A1* | 12/2004 | Horii | F02C 7/1435 |
| | | | | 60/775 |
| 2006/0277916 | A1* | 12/2006 | Hoffmann | B05B 12/085 |
| | | | | 60/772 |
| 2007/0059159 | A1* | 3/2007 | Hjerpe | B08B 3/02 |
| | | | | 415/117 |
| 2008/0250769 | A1* | 10/2008 | Wagner | F02C 7/04 |
| | | | | 60/39.24 |

* cited by examiner

SYSTEMS AND METHODS FOR CONTROLLING LIQUID FLOW TO A TURBINE FOGGING ARRAY

BACKGROUND

Combustion turbines bring in fresh ambient air, mix the fresh ambient air with fuel in a combustion chamber, and ignite the air-fuel mixture. This produces a high-temperature and high-pressure flow of exhaust gases that produce the shaft work output that is generally used to move an electric generator. The fresh ambient air is typically brought in through an inlet housing structure that may include one or more filters and/or other components.

The performance of the combustion turbine is dependent on the conditions of the air that is mixed with the fuel in the combustion turbine. For example, the amount of fuel that can be contained in an air-fuel mixture is dependent on the density of the air, which in turn is dependent on relative humidity, altitude, pressure drop, and temperature.

Fogging is utilized in some combustion turbine installations to reduce the temperature of air supplied to the combustion turbine. Generally, fogging supplies liquid (e.g., water) to an array of fogging nozzles located upstream of the turbine compressor blades. The fogging array introduces a spray of the water to thereby reduce inlet air temperature. The fogging array may be positioned, for example, in the inlet housing structure. For instance, the fogging array may be positioned downstream of the filter stage in the inlet housing structure. In some implementations, to reduce the amount of moisture that reaches the combustion turbine, condensers and/or other moisture eliminators may be provided downstream of the fogging array, but upstream of the combustion turbine.

SUMMARY

This specification is directed generally to methods and apparatus for controlling liquid flow to a turbine fogging array. The methods and apparatus described herein may, in some implementations, provide for liquid flow to the turbine fogging array that is adapted to particular weather conditions, adapted to a particular mass flow rate of intake air of the combustion turbine, and/or adapted to a particular wear condition of a pump that supplies the liquid flow to the turbine fogging array. Such adaptations may minimize a degree of, and/or frequency of occurrence of, undersupply and/or oversupply of liquid to the turbine fogging array. The methods and apparatus described herein may, in some implementations, actuate one or more control valves that each control liquid throughput to one or more fogging nozzles of the fogging array. In some of those implementations, the control valves may be actuated based on desired and actual water pressure values downstream of the pump to allow for improved water pressure control under varying conditions such as varying pump conditions, and/or varying system leakage and/or blockage conditions.

Some implementations are generally directed toward adjusting the output of a variable output pump that supplies water to the turbine fogging array. In some of those implementations, the output is adjusted based on a determined target pump output value that is indicative of a pump output required to change the moisture content of intake air of the combustion turbine to meet a target humidity value such as, for example, a 100% target relative humidity value. In some of those implementations, the target pump output value may be determined based on data from one or more sensors such as one or more weather sensors and/or one or more turbine mass flow sensors. In some of those implementations, the output of the pump may be further adjusted based on feedback from a flow rate sensor located downstream of the pump and in the path of the liquid supplied by the pump.

Some implementations are generally directed toward actuating at least one control valve of a plurality of control valves that control liquid throughput to one or more fogging nozzles of a fogging array. In some of those implementations, the at least one control valve is actuated based on comparing an anticipated pressure value for liquid in a conduit between a pump and a fogging array to a measured actual pressure value in the conduit. In some versions of those implementations, the control valves may be actuated to increase or decrease the actual pressure value and make it more conforming to the anticipated pressure value.

In some implementations, a method of adjusting pump output of a pump supplying liquid to a fogging array positioned upstream of a combustion turbine may be provided that includes: receiving weather sensor data indicative of one or more weather conditions of intake air of the combustion turbine; identifying a target humidity value for the intake air; determining, based on the weather sensor data and the target humidity value, a target pump output value indicative of a pump output required to change the moisture content of the intake air to meet the target humidity value; and adjusting the output of a variable output pump based on the target pump output value, the variable output pump supplying liquid to a fogging array positioned upstream of the combustion turbine.

In some implementations, a system for controlling output of a fogging array positioned upstream of a combustion turbine may be provided that includes: one or more weather sensors measuring one or more conditions of intake air of the combustion turbine and providing weather sensor data responsive to the measurements, the weather sensor data enabling determination of relative humidity of the intake air; a variable output pump supplying liquid to a fogging array positioned upstream of the combustion turbine, the variable output pump operable at a plurality of speeds; memory storing instructions; a controller receiving the weather sensor data and coupled to a drive for the pump, the controller operable to execute the instructions stored in the memory; wherein the instructions comprise instructions to: identify a target humidity value for the intake air; determine, based on the weather sensor data and the target humidity value, a target pump output value indicative of a pump output required to change the moisture content of the intake air to meet the target humidity value; and adjust the speed for the variable output pump based on the target pump output value.

In some implementations, a method of adjusting pump output of a pump supplying liquid to a fogging array positioned upstream of a combustion turbine may be provided that includes: receiving weather sensor data indicative of one or more weather conditions of intake air of the combustion turbine; determining a target pump output value based on the weather sensor data; adjusting the output of a variable output pump based on the target pump output value, the variable output pump supplying liquid to a fogging array positioned upstream of the combustion turbine; receiving flow rate sensor data from a flow rate sensor, the flow rate sensor located downstream of the pump and in a path of the liquid supplied by the pump; and further adjusting the output of the variable output pump based on the flow rate sensor data and the target pump output value.

In some implementations, a method of adjusting pump output of a pump supplying liquid to a fogging array positioned upstream of a combustion turbine may be provided that includes: receiving weather sensor data indicative of one or more weather conditions of intake air of the combustion turbine; receiving turbine mass flow data indicative of a mass flow rate of the intake air; determining a target pump output value based on the weather sensor data and the mass flow data; and adjusting the output of a variable output pump based on the target pump output value, the variable output pump supplying liquid to a fogging array positioned upstream of the combustion turbine.

The term "controller" is used herein generally to describe various apparatus relating to the operation of one or more fluid pumps and/or control valves. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
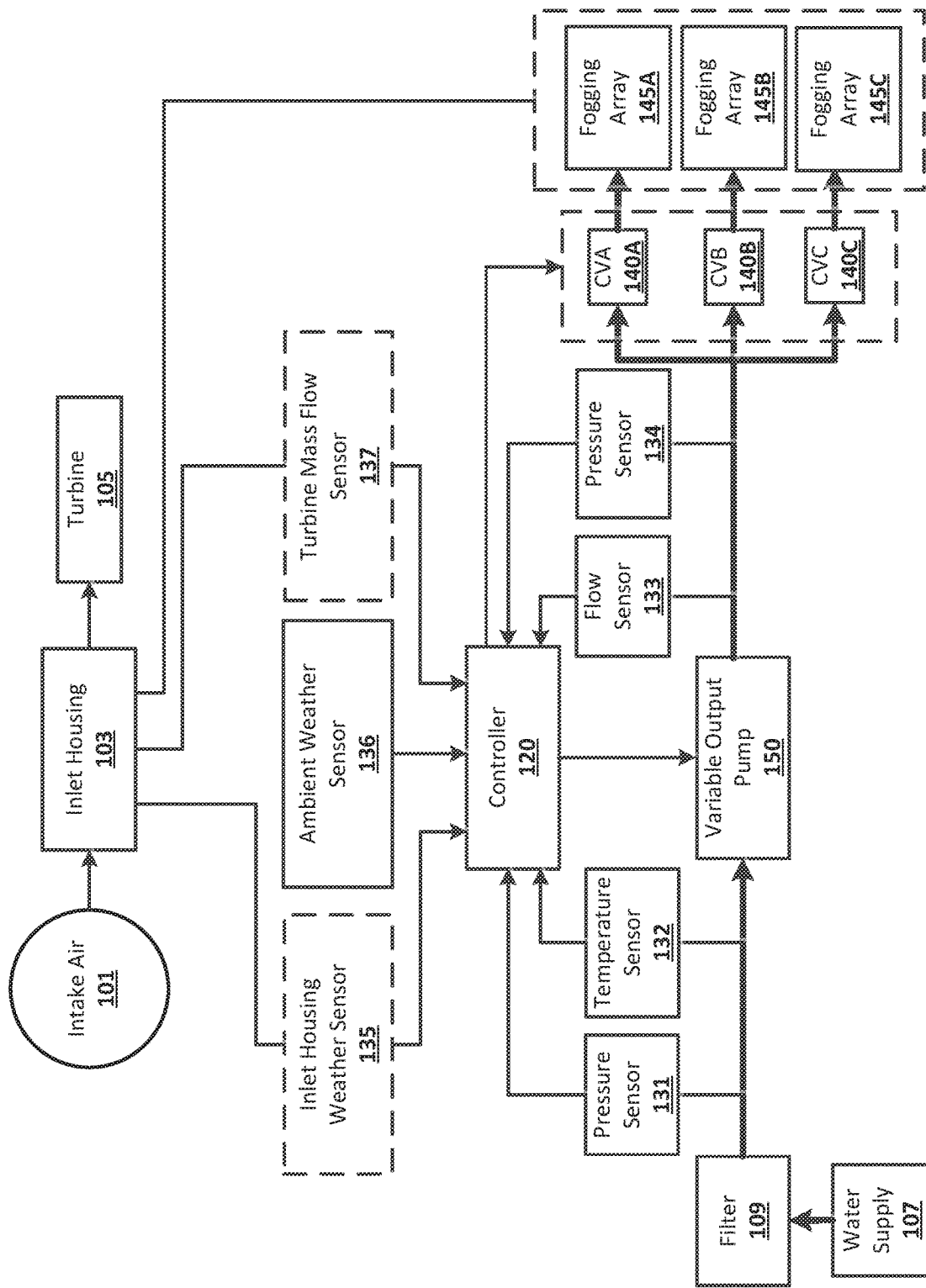
FIG. 1 illustrates an example environment in which liquid flow to a turbine fogging array may be controlled.

FIG. 1 illustrates an example environment in which liquid flow to a turbine fogging array may be controlled. The example environment of FIG. 1 includes intake air 101 (e.g., ambient air) that is drawn into an inlet housing 103 by the rotating blades of a combustion turbine 105, such as a gas combustion turbine. The intake air 101 is communicated through inlet housing 103 and into the combustion turbine 105. The combustion turbine 105 mixes the intake air 101 with fuel in a combustion chamber, and ignites the air-fuel mixture. This produces a high-temperature and high-pressure flow of exhaust gases that produce the shaft work output of the combustion turbine 105 that is generally used to move an electric generator.

The inlet housing 103 may include one or more filters (e.g., at an "intake" end of the inlet housing 103). The inlet housing 103 may further optionally house and/or support one or more additional components such as fogging arrays (145A-145C), inlet housing weather sensor 135, and/or turbine mass flow sensor 137. Components 145A-C, 135, and 137 are illustrated in FIG. 1 surrounded by dashed lines and connected to inlet housing 103 with solid lines to indicate at least those components may be housed in and/or supported by inlet housing 103. One or more other components of FIG. 1 may also be housed in and/or supported by inlet housing 103 in some implementations, or may be positioned spaced away from inlet housing 103 in some implementations.

Generally, a variable output pump 150 pulls water through one or more conduits coupled to a water supply 107 and supplies the water through one or more conduits to one or more downstream fogging arrays 145A-C. The fogging arrays 145A-C are positioned in the inlet housing 103 and introduce a spray of the water in the inlet housing 103 to thereby reduce the temperature of the intake air 101 before it is supplied to the combustion turbine 105. Although three fogging arrays 145A-C are illustrated in the example of FIG. 1, more or fewer fogging arrays may be provided. In some implementations, the water supply 107 may be a demineralized water supply. In some implementations, a filter 109 may be interposed between the water supply 107 and the variable output pump 150 to filter one or more particulates from the water supply 107.

Various sensors are provided in the example environment of FIG. 1. The sensors include: a pressure sensor 131 measuring pressure in a conduit between the water supply 107 and the variable output pump 150; a temperature sensor 132 measuring temperature of water in the conduit between the water supply 107 and the variable output pump 150; a flow sensor 133 measuring flow rate of fluid in a conduit between the variable output pump 150 and the fogging arrays 145A-C; and a pressure sensor 134 measuring pressure in a conduit between the variable output pump 150 and the fogging arrays 145A-C.

The sensors further include an inlet housing weather sensor 135 measuring one or more weather conditions such as temperature and/or humidity. For example, the inlet housing weather sensor 135 may comprise one or more sensors that collectively measure both temperature and water content of air and provide data indicative of both and/or data indicative of a relative humidity determined based on both. The inlet housing weather sensor 135 may be positioned within the inlet housing 103 and exposed to airflow through the inlet housing 103. For example, the sensor 135 may be positioned downstream of the fogging arrays 145A-C, such as at a location just before the combustion turbine 105.

The sensors further include an ambient weather sensor 136 measuring one or more weather conditions such as temperature and/or humidity. For example, the ambient weather sensor 136 may comprise one or more sensors that collectively measure both temperature and water content of air and provide data indicative of both and/or data indicative of a relative humidity determined based on both. The ambient weather sensor 136 may be positioned to measure ambient air before it interacts with water spray output from the fogging arrays 145A-C. For example, the ambient weather sensor 136 may be positioned external to the inlet housing 103, or within the inlet housing 103 positioned upstream of the fogging arrays 145A-C, such as at a location just before filters of the inlet housing 103.

The sensors further include turbine mass flow sensor 137 measuring the mass flow rate of air. For example, the sensor 137 may provide data indicative of weight of air over a period of time. The turbine mass flow sensor 137 may be positioned to measure a mass flow rate of air being pulled in by the combustion turbine 105. For example, the sensor 137 may be positioned within the inlet housing 103, such as at a location just before the combustion turbine 105.

Particular sensors are illustrated in the example environment of FIG. 1 and are illustrated and/or described as being positionable in particular locations. However, in some implementations one or more of the sensors may be omitted and/or repositioned. For example, in some implementations the flow sensor 133 may be positioned upstream of the variable output pump 150. For example, it may be positioned right before the intake of the variable output pump 150. As another example, in some implementations, one or more of the ambient weather sensor 136, the turbine mass flow sensor 137, the pressure sensor 131, the temperature sensor 132, the flow sensor 133, and/or the pressure sensor 134 may be omitted.

Generally, the controller 120 receives sensor data from one or more sensors (e.g., sensors 131-137 of FIG. 1) and, based at least in part on the sensor data, adjusts the output of the variable output pump 150 and/or actuates one or more of the control valves 140A-C. For example, controller 120 may determine a target pump output value based on sensor data from inlet housing weather sensor 135, ambient weather sensor 136, and/or turbine mass flow sensor 137 and adjust the variable output pump 150 based on the target pump output value. Additional description is provided in FIGS. 2-4 of example sensor data, and example uses of sensor data in adjusting the output of the variable output pump 150 and/or actuating one or more of the control valves 140A-C.

The variable output pump 150 is configured to produce a plurality of distinct outputs (e.g., variable speeds and/or variable types of rotations, displacements, reciprocations, etc.). Adjusting the output of the variable output pump 150 adjusts the resulting flow rate of liquid that is pumped by the variable output pump 150. For example, the variable output pump 150 may have a discrete number of speeds at which the pump may operate and the flow rate may be distinct at each of the plurality of speeds. Also, for example, the variable output pump 150 may be continuously variable between a minimum and a maximum speed, and one or more of the variable speeds may produce a distinct flow rate.

The controller 120 may provide various types of output to adjust the output of the variable output pump 150. For example, the variable output pump 150 may be driven by an AC motor that is controlled by a variable frequency drive and the controller 120 may provide a control signal to the variable frequency drive that dictates the driving characteristics that should be applied to the AC motor (and that will resultantly affect the speed of the pump).

The control valves 140A-C are each actuable between at least a first position and a second position. For example, the control valves 140A-C may each be actuable between at least an "open" position and a "closed" position. Each of the control valves 140A-C may be coupled to an actuator that actuates the control valve between at least the on position and the off position. The controller 120 may individually control each of the actuators. For example, each of the actuators may be associated with an address and the controller 120 may send an actuation signal that is addressed to one or more of the actuators. Generally, the controller 120 utilizes one or more inputs, such as inputs from pressure sensor 131 and/or pressure sensor 134 to determine which of the control valves 140A-C should be opened, and which should be closed (if any). Although three control valves 140A-C are illustrated in the example of FIG. 1, more or fewer control valves may be provided. For example, a single control valve may control multiple fogging arrays and/or additional fogging arrays and corresponding control valves may be provided.

Figure 2:
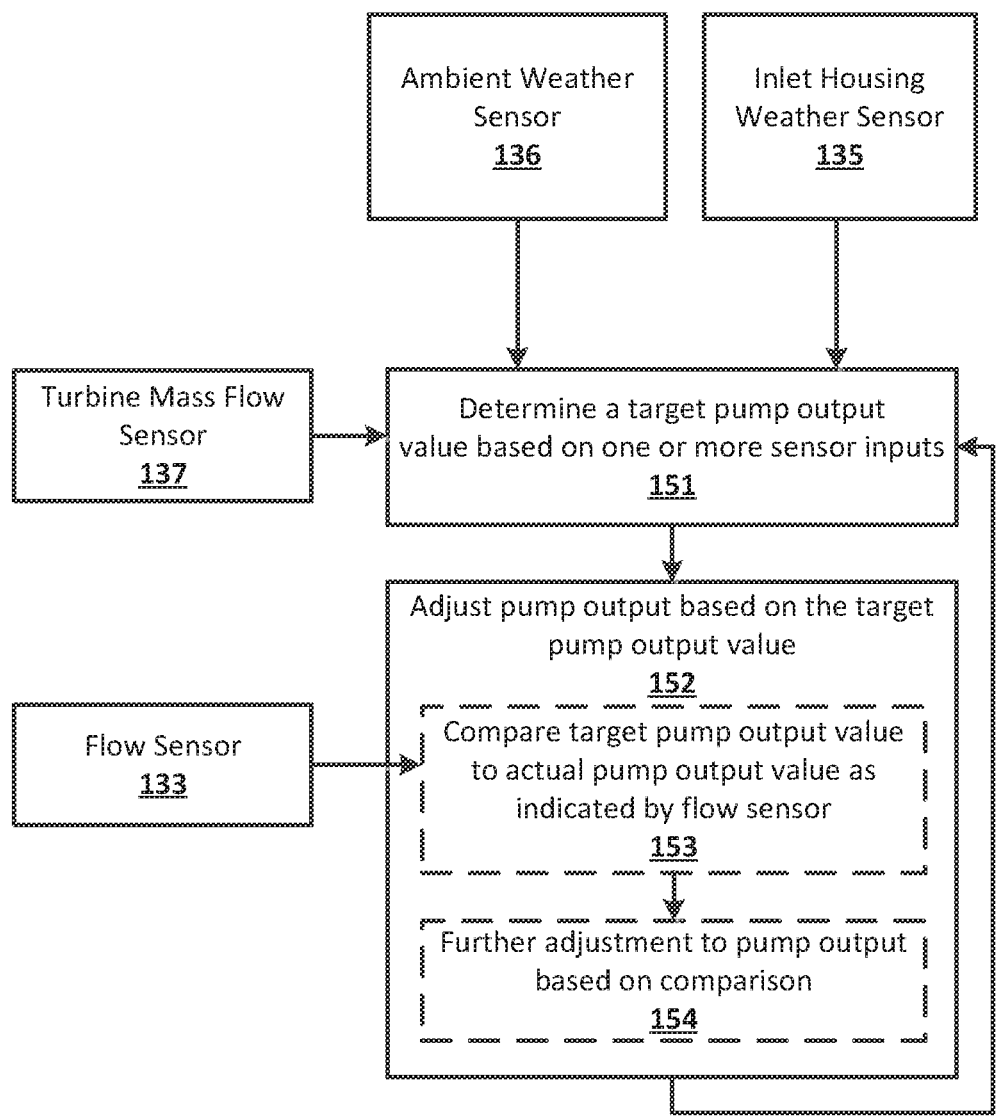
FIG. 2 illustrates an example of using various inputs to determine a target pump output value and adjusting a pump output based on the target pump output value.

Referring to FIG. 2, an example is provided of using various inputs to determine a target pump output value and adjusting a pump output based on the target pump output value. FIG. 2 is described with respect to steps that may be performed by, for example, the controller 120. Other implementations may perform the steps in a different order, omit certain steps, and/or perform different and/or additional steps than those illustrated in FIG. 2.

At step 151, a target pump output value is determined based on one or more sensor inputs. As one example, the ambient weather sensor 136 and the turbine mass flow sensor 137 may each provide sensor data to the controller 120 and the controller 120 may determine the target pump value based on such sensor data. As described herein, the sensor data provided by ambient weather sensor 136 may indicate relative humidity alone and/or may indicate temperature value and a humidity value. As also described herein, the sensor data provided by turbine mass flow sensor 137 may indicate a mass flow rate of the intake air being provided to the combustion turbine. In some implementations, the turbine mass flow sensor 137 may be omitted and a preset mass flow rate may be utilized. The preset mass flow rate may be set, for example, during commissioning and/or programming of the controller 120 and may be based on one or more characteristics of the combustion turbine 105. For example, the mass flow rate may be set based on determined performance data for the combustion turbine 105.

In some implementations, the controller 120 may determine the target pump output value based on a formula that takes into account an ambient temperature, an ambient humidity, and a mass flow rate of the intake air. For example, the formula may generally increase the target pump output value (where an increasing value indicates increasing pump output) as the ambient temperature increases and the mass flow rate of the intake air increases. The formula may further set a maximum for the target pump output value based on the ambient humidity. For example, as the ambient humidity increases, the maximum for the target pump output value may decrease (where a decreasing value indicates decreasing pump output). Accordingly, based on such a formula the target pump output value will increase as the temperature and mass flow rate increase, but will be capped based on the humidity (since humidity limits the lowest temperature to which air can be cooled, this cap will minimize oversaturation and/or wasted water).

As another example of a formula that takes into account an ambient temperature, an ambient humidity, and a mass flow rate of the intake air, the formula may determine, based on the ambient temperature and the ambient humidity, how much more water vapor mass would fit in a given mass of air to reach a desired relative humidity level such as 100%. For example, a formula that subtracts the specific humidity of the air from a target humidity level may be utilized. The formula may further modify such determination based on the mass flow rate of the intake air to determine a quantity of water vapor that would be needed for a given time to reach the desired relative humidity level, and utilize such determination to determine the target pump output value. For instance, the target pump output value would be set to a value that would output approximately the quantity of water vapor over the given time period. Formulae, tables, and/or other data structures may map target pump output values to quantities of water vapor for one or more time periods and may be utilized by the controller 120 in determining a target pump output value based on a quantity of water vapor for a given time period. In some other implementations, the target pump output value itself may be expressed as a quantity of water vapor.

As yet another example, the inlet housing weather sensor 135 and the turbine mass flow sensor 137 may each provide sensor data to the controller 120 and the controller 120 may determine the target pump value based on such sensor data. An example of the controller 120 determining the target pump value based on such sensor data is described in more detail with respect to FIG. 3.

Additional and/or alternative formulae may be utilized to determine a target pump output value. For example, a formula that takes into account a temperature of the liquid provided to the variable output pump 150 (e.g., as indicated by sensor data of temperature sensor 132) and/or a pressure of the liquid provided to the variable output pump 150 (e.g., as indicated by pressure sensor 131) may be utilized. Also, in some implementations a table may be stored in memory accessible by the controller 120 and may include target pump output values mapped to one or more input variables. Such a table may be accessed by controller 120 to determine a target pump output value. For example, the table may be searched based on received sensor data to determine a target pump output value.

At step 152, the pump is adjusted based on the target pump output value determined at step 151. For example, the variable output pump 150 may be driven by an AC motor that is controlled by a variable frequency drive and the controller 120 may provide a control signal to the variable frequency drive that dictates the driving characteristics that should be applied to the AC motor to achieve the target pump output value. In some implementations, formulae, tables, and/or other data structures may map target pump output values to corresponding control signals and may be utilized by the controller 120 in determining control signals to provide for adjusting the pump output of the variable output pump 150.

At optional step 153, the target pump output value is compared to an actual pump output value as indicated by sensor data from flow sensor 133. For example, the target pump output value may be indicative of a desired flow rate and may be compared to an actual flow rate as indicated by sensor data from flow sensor 133. At optional step 154, further adjustments are made to the pump output based on the comparison of step 153. For instance, if the actual flow rate is less than the desired flow rate, the pump output may be increased in an attempt to achieve the desired flow rate. On the other hand, if the actual flow rate is greater than the desired flow rate, the pump output may be decreased in an attempt to achieve the desired flow rate. The degree to which the pump output is increased or decreased may be correlated to the difference between the desired flow rate and the actual flow rate. For example, the output may be affected to a greater degree if the difference is 5 gallons per minute than if the difference was only 3 gallons per minute.

In some implementations, steps 153 and 154 may be performed iteratively by the controller 120. For example, the steps 153 and 154 may be performed until a difference between the desired flow rate and the actual flow rate is less than a threshold value and/or until a maximum number of iterations are performed. In some implementations, the controller 120 may not further adjust the pump output at step 154 unless the difference between the desired flow rate and the actual flow rate satisfies a threshold such as, for example, 0.1 gallons per minute.

After the pump is adjusted by the controller 120 at step 152 and/or further adjusted at step 154, the controller 120 may again determine a target pump output value based on one or more sensor outputs at step 151 (optionally after a timeout period). If the target pump output value is different than the previously determined pump output value, the controller 120 may again at step 152 adjust the pump output based on the target pump output value. The steps 151, 152, and optional steps 153 and 154 may be iteratively performed to dynamically adjust the pump output as one or more conditions sensed by one or more sensors change.

Figure 3:
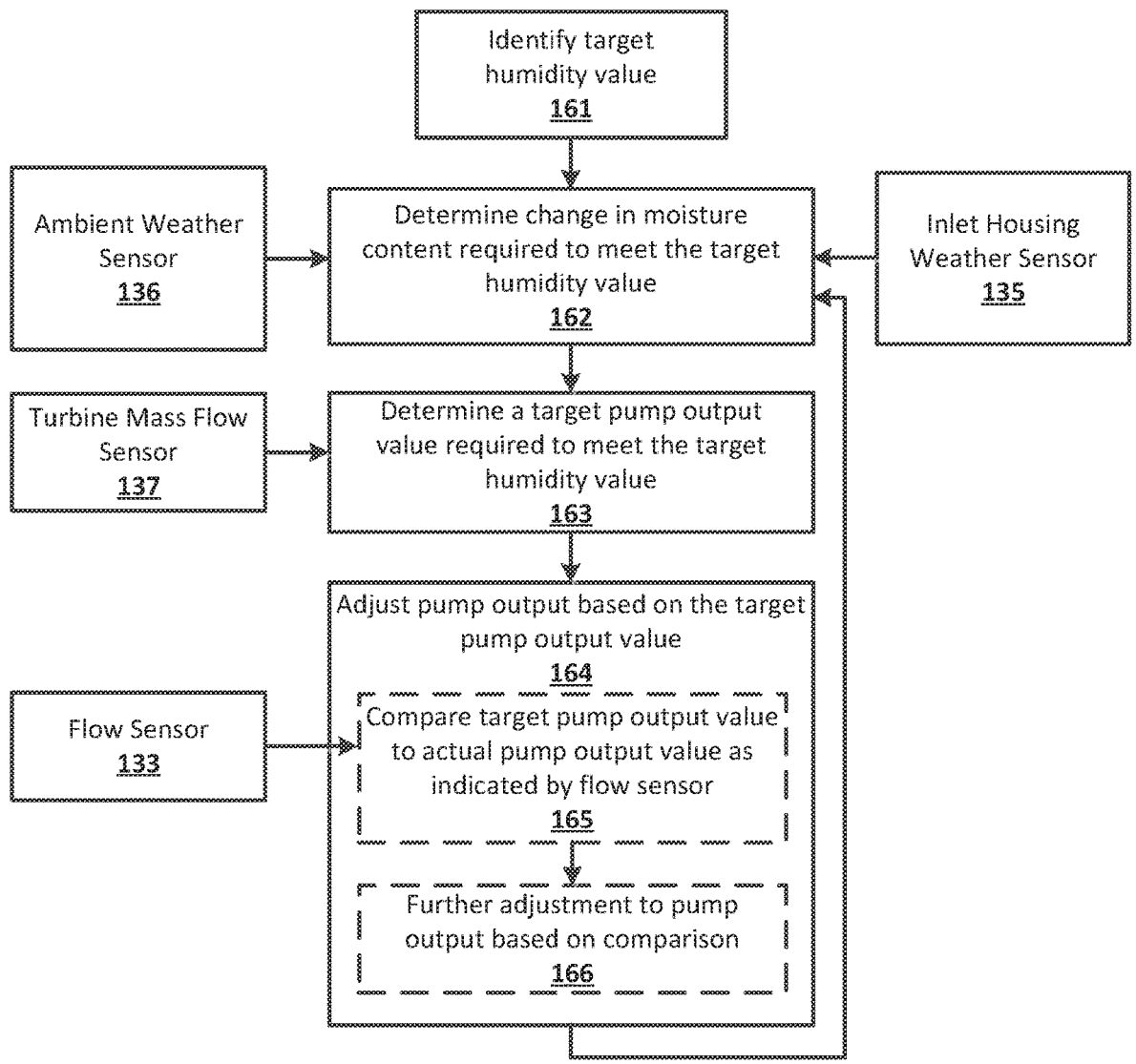
FIG. 3 illustrates another example of using various inputs to determine a target pump output value and adjusting a pump output based on the target pump output value.

Referring to FIG. 3, another example is provided of using various inputs to determine a target pump output value and adjusting a pump output based on the target pump output value. FIG. 3 is described with respect to steps that may be performed by, for example, the controller 120. Other implementations may perform the steps in a different order, omit certain steps, and/or perform different and/or additional steps than those illustrated in FIG. 3.

At step 161, a target humidity value is identified. The target humidity value may be, for example, a target relative humidity value such as 90%, 95%, or 100% relative humidity. The target humidity value may be stored in memory accessible by the controller 120 and may optionally be adjusted based on operator input and/or based on one or more factors, such as ambient temperature (as indicated by ambient weather sensor 136) and/or inlet housing temperature (as indicated by inlet housing weather sensor 135).

At step 162, a change in moisture content required to meet the target humidity level is determined. For example, the controller 120 may utilize sensor data from ambient weather sensor 136 to determine a difference between the ambient humidity and the target humidity value. The difference may be identified as the change in moisture content required to meet the target humidity level. Also, for example, the controller 120 may utilize sensor data from inlet housing weather sensor 135 to determine a difference between the humidity of the inlet housing 103 and the target humidity value. The difference may be identified as the change in moisture content required to meet the target humidity level.

At step 163, a target pump output value required to meet the target humidity value is determined. For example, when the target humidity level is based on the sensor data from the ambient weather sensor 136, the target pump output value may be determined based on identifying the pump output required to achieve the change in moisture content and utilizing that pump output as the target pump output value. For instance, where the change in moisture content is expressed as a quantity of water vapor for a period of time, the target pump output value may be set to deliver approximately that quantity of water vapor for the period of time. The controller may optionally determine the quantity of water vapor needed for a period of time based on turbine mass flow rate data as described herein (e.g., based on sensor data from turbine mass flow sensor 137).

As another example, when the target humidity level is based on the sensor data from the inlet housing weather sensor 135, the target pump output value may be determined based on identifying the pump output required to achieve the change in moisture content and utilizing as the target pump output value, that pump output added to the current pump output. In other words, the controller 120 will determine to what extent the current pump output needs to be increased to achieve the target humidity level. For instance, where the change in moisture content is expressed as a quantity of water vapor for a period of time, the target pump output value may be set to add to the current pump output, whatever additional pump output is needed to deliver approximately that quantity of water vapor for the period of time. The controller 120 may optionally determine the quantity of water vapor needed for a period of time based on turbine mass flow rate data as described herein (e.g., based on sensor data from turbine mass flow sensor 137).

At step 164, the pump is adjusted based on the target pump output value determined at step 163. For example, the variable output pump 150 may be driven by an AC motor that is controlled by a variable frequency drive and the controller 120 may provide a control signal to the variable frequency drive that dictates the driving characteristics that should be applied to the AC motor to achieve the target pump output value. At optional step 165, the target pump output value is compared to an actual pump output value as indicated by sensor data from flow sensor 133. For example, the target pump output value may be indicative of a desired flow rate and may be compared to an actual flow rate as indicated by sensor data from flow sensor 133. At optional step 166, further adjustments are made to the pump output based on the comparison of step 165. For instance, if the actual flow rate is less than the desired flow rate, the pump output may be further increased in an attempt to achieve the desired flow rate. In some implementations, the steps 165 and 153 may be performed iteratively by the controller 120. For example, the steps 165 and 166 may be performed until a difference between the desired flow rate and the actual flow rate is less than a threshold value and/or until a maximum number of iterations are performed. Steps 164-166 of FIG. 3 may share one or more aspects in common with steps 152-154 of FIG. 2. Also, steps 161-163 of FIG. 3 may share one or more aspects in common with step 151 of FIG. 2.

After the pump is adjusted by the controller at step 164 and/or further adjusted at step 166, the controller 120 may again determine a target pump output value based on one or more sensor outputs at step 162 (optionally after a timeout period). If the target pump output value is different than the previously determined pump output value, the controller 120 may progress through the other steps. The steps 161-166 may be iteratively performed to dynamically adjust the pump output as one or more conditions sensed by one or more sensors change.

Figure 4:
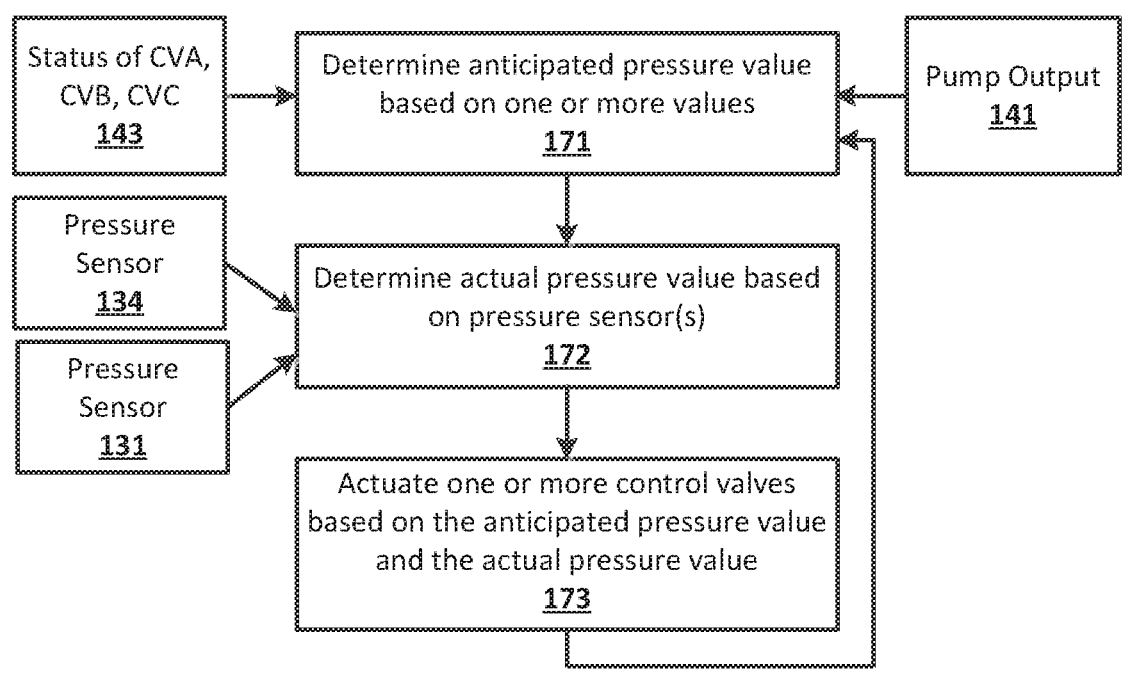
FIG. 4 illustrates an example of actuating one or more control valves based on an anticipated pressure value and an actual pressure value.

FIG. 4 illustrates an example of actuating one or more control valves based on an anticipated pressure value and an actual pressure value. FIG. 4 is described with respect to steps that may be performed by, for example, the controller 120. Other implementations may perform the steps in a different order, omit certain steps, and/or perform different and/or additional steps than those illustrated in FIG. 4. In some implementations, the example of FIG. 4 may be performed in combination with one or more of the examples described with respect to FIGS. 2 and 3. In other implementations, the example of FIG. 4 may be performed independently of the examples described with respect to FIGS. 2 and 3.

At step 171, an anticipated pressure value is determined based on one or more values. For example, the controller 120 may determine an anticipated pressure value for a conduit between the variable output pump 150 and the fogging arrays 145A-C based on a current pump output 141 and/or the current status 143 of one or more control valves 140A-C. For example, data in memory accessible by the controller 120 may define, for each of a plurality of pump outputs, anticipated pressure values. Also, for example, data in memory accessible by the controller 120 may define, for each of a plurality of pump outputs and a plurality of valve statuses, anticipated pressure values. For example, a pressure of X may be associated with a "full" pump output of variable output pump 150 and all valves 140A-C being open, whereas a pressure of Y may be associated with "half" pump output of variable output pump 150 and all valves 140A-C being open and a pressure of Z may be associated with a "full" pump output of variable output pump 150 and two of the three valves 140A-C being open. In some implementations, the controller 120 may determine the anticipated pressure also based on sensor data provided by the temperature sensor 132 (to account for differences in pressure that may be due to temperature changes).

In some implementations, the anticipated pressure values may be set, for example, during commissioning and/or programming of the controller 120. For example, in some implementations the anticipated pressure value for a "full" pump output of variable output pump 150 and all valves 140A-C being open may be determined based on a measured pressure value (e.g., based on sensor data from pressure sensor 134) under those conditions during commissioning. The anticipated pressure value may be manually and/or automatically stored in memory accessible by the controller 120.

At step 172, an actual pressure value is determined based on one or more pressure sensors such as pressure sensor 134 and/or pressure sensor 131. For example, the controller 120 may determine the actual pressure based on sensor data provided by pressure sensor 134.

At step 173, one or more of the control valves 140A-C are actuated based on the anticipated pressure value and the actual pressure value. For example, when the actual pressure value is greater than the anticipated pressure value, the controller 120 can cause one or more of the control valves 140A-C that are in a closed position to be moved to an open position. Also, for example, when the actual pressure value is greater than the anticipated pressure value, the controller 120 can cause one or more of the control valves 140A-C that are in a partially open position to be moved to more open position. As yet another example, when the actual pressure value is less than the anticipated pressure value, the controller 120 can cause one or more of the control valves 140A-C that are in an open position to be moved to a closed position. The number of control valves 140A-C actuated and/or the extent of the actuation may be dependent on the difference between the actual pressure value and the anticipated pressure value. In some implementations, the controller 120 may not actuate one or more of the control valves 140A-C at step 173 unless the difference between the anticipated pressure value and the actual pressure value satisfies a threshold.

In some implementations, steps 172 and 173 may be performed iteratively by the controller 120. For example, the steps 172 and 173 may be performed until a difference between the anticipated pressure value and the actual pressure value is less than a threshold value and/or until a maximum number of iterations are performed. In some of those implementations, the control valves that are actuated and/or the degree of actuation of those control valves may vary in one or more of the iterations. For example, the controller 120 may, at a first iteration actuate control valve 140A from an open position to a closed position then, at a second iteration, actuate the control valve 140A from the closed position back to the open position and actuate the control valve 140B from an open position to a closed position. Varying which control valves are actuated (and/or a degree of the actuation(s)) on multiple iterations may enable a blockage and/or a leakage condition to be ameliorated.

As one example, assume a leak is present in fogging array 145B and that all of the control valves 140A-C are initially in an open position. Under such a scenario, the actual pressure may be significantly less than the anticipated pressure value due to the presence of the leak. At a first iteration, the controller 120 may actuate the control valve 140A to a closed position and maintain the open position of the other control valves 140B and 140C. At a second iteration, the controller 120 may determine the actual pressure value is still significantly less than the anticipated pressure value (since the control valve 140B is still open that feeds the fogging array 145B with a leak). At the second iteration, the controller 120 may actuate the control valve 140A to an open position and actuate the control valve 140B to a closed position. At the third iteration, the controller 120 may determine the actual pressure value is not significantly less than the anticipated pressure value (since the control valve 140B that feeds the fogging array 145B with a leak was closed in the second iteration). Based on such a determination, the controller 120 may not make any further adjustments to the control valves 140A-C. In some of those implementations, the controller 120 may initiate an audible and/or visible alert to notify an operator of the presence of a leak condition and/or a location of the leak condition. In some of those implementations, where the controller 120 is unable to cause an actual pressure value to be within an anticipated pressure value after one or more iterations, the controller 120 may shut down the variable output pump 150 and/or may initiate an audible and/or visible alert to notify an operator of the presence of a leakage or blockage condition.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A system for controlling output of a fogging array positioned upstream of a combustion turbine, the system comprising:
    one or more weather sensors measuring one or more conditions of intake air of the combustion turbine and providing weather sensor data responsive to the measurements, the weather sensor data enabling determination of relative humidity of the intake air;
    a variable output pump supplying liquid to the fogging array positioned upstream of the combustion turbine, the variable output pump operable at a plurality of speeds;
    memory storing instructions;
    a controller receiving the weather sensor data and coupled to a drive for the pump, the controller configured to execute the instructions stored in the memory;
    wherein the instructions comprise instructions to:
        identify a target humidity value for the intake air;
        determine, based on the weather sensor data and the target humidity value, a target pump output value indicative of a pump output required to change the moisture content of the intake air to meet the target humidity value;
        adjust the speed for the variable output pump based on the target pump output value;
        determine presence of a leakage condition, wherein the instructions to determine presence of the leakage condition comprise instructions to:
            actuate a plurality of control valves into a plurality of configurations in which at least one control valve of the plurality of control valves is in an open position for each of the plurality of configurations, each of the plurality of control valves controlling liquid throughput to one or more corresponding nozzles of the fogging array,
            for each of the plurality of configurations, compare an actual pressure value, for the liquid in a conduit between the variable output pump and the fogging array, to an anticipated pressure value, and
            determine the presence of the leakage condition is at a particular control valve, of the control valves, based on at least one of the comparisons between the actual pressure value and the anticipated pressure value; and
        in response to determining the presence of the leakage condition is at the particular control valve, actuate the particular control valve into an at least partially closed position.

2. The system of claim 1, further comprising:
    a temperature sensor measuring temperature of the liquid and generating temperature sensor data, the temperature sensor located upstream of the variable output pump and measuring the temperature of the liquid before the liquid encounters the variable output pump;

wherein the instructions to determine the target pump output value further comprise instructions to determine the target pump output value further based on the temperature sensor data.

3. The system of claim 1, further comprising:

a flow rate sensor located downstream of the variable output pump and in the path of the liquid supplied by the pump, the flow rate sensor measuring flow of the liquid and providing flowrate sensor data to the controller;

wherein the instructions to determine the target pump output value further comprise instructions to determine the target pump output value further based on the flow rate sensor data.

4. The system of claim 3, further comprising:

a temperature sensor measuring temperature of the liquid and generating temperature sensor data, the temperature sensor located upstream of the variable output pump and measuring the temperature of the liquid before the liquid encounters the variable output pump;

wherein the instructions to determine the target pump output value further comprise instructions to determine the target pump output value further based on the temperature sensor data.

5. A system for controlling output of a fogging array positioned upstream of a combustion turbine, the system comprising:

one or more weather sensors measuring one or more conditions of intake air of the combustion turbine and providing weather sensor data responsive to the measurements, the weather sensor data enabling determination of relative humidity of the intake air;

a variable output pump supplying liquid to the fogging array positioned upstream of the combustion turbine, the variable output pump operable at a plurality of speeds;

memory storing instructions;

a controller receiving the weather sensor data and coupled to a drive for the pump, the controller configured to execute the instructions stored in the memory;

wherein the instructions comprise instructions to:
 identify a target humidity value for the intake air;
 determine, based on the weather sensor data and the target humidity value, a target pump output value indicative of a pump output required to change the moisture content of the intake air to meet the target humidity value;
 adjust the speed for the variable output pump based on the target pump output value;
 determine presence of a leakage condition; and
 initiate an audible and/or visible alert in response to determining the presence of the leakage condition;

wherein the instructions to determine presence of the leakage condition comprise instructions to:
 actuate a plurality of control valves into a plurality of configurations in which at least one control valve of the plurality of control valves is in an open position for each of the plurality of configurations, each of the plurality of control valves controlling liquid throughput to one or more corresponding nozzles of the fogging array,
 for each of the plurality of configurations, compare an actual pressure value, for the liquid in a conduit between the variable output pump and the fogging array, to an anticipated pressure value, and
 determine the presence of the leakage condition is at a particular control valve, of the control valves, based on at least one of the comparisons between the actual pressure value and the anticipated pressure value.

6. The system of claim 5, wherein the alert notifies an operator of a location of the leakage condition.

7. The system of claim 5, further comprising:

a temperature sensor measuring temperature of the liquid and generating temperature sensor data, the temperature sensor located upstream of the variable output pump and measuring the temperature of the liquid before the liquid encounters the variable output pump;

wherein the instructions to determine the target pump output value further comprise instructions to determine the target pump output value further based on the temperature sensor data.

8. The system of claim 5, further comprising:

a flow rate sensor located downstream of the variable output pump and in the path of the liquid supplied by the pump, the flow rate sensor measuring flow of the liquid and providing flowrate sensor data to the controller;

wherein the instructions to determine the target pump output value further comprise instructions to determine the target pump output value further based on the flow rate sensor data.

\* \* \* \* \*